A. F. KOCH.
FILM SIGNAL FOR MOVING PICTURE MACHINES.
APPLICATION FILED SEPT. 5, 1912.

1,078,861.

Patented Nov. 18, 1913.

Inventor
A. F. Koch.

Witnesses

Attorneys.

UNITED STATES PATENT OFFICE.

ARTHUR F. KOCH, OF DECATUR, ILLINOIS.

FILM-SIGNAL FOR MOVING-PICTURE MACHINES.

1,078,861.  Specification of Letters Patent.  Patented Nov. 18, 1913.

Application filed September 5, 1912. Serial No. 718,770.

*To all whom it may concern:*

Be it known that I, ARTHUR F. KOCH, citizen of the United States, residing at Decatur, in the county of Macon and State of Illinois, have invented certain new and useful Improvements in Film-Signals for Moving-Picture Machines, of which the following is a specification.

My invention relates to moving picture mechanism and particularly to means for indicating when the film has been nearly exhausted from the film magazine or retort.

The primary object of my invention is to provide a very simple, effective, and certain device for the purpose of indicating the exhaustion of a film from the film magazine or retort, operating to actuate a signal when the film has nearly run out.

A further object is to provide a signal actuating device including a member resting upon the roll of film in the magazine, which as the film is used up follows the film and moves toward the center of the reel and eventually closes a circuit whereby a signal may be sounded.

Other objects will appear in the course of the following description.

Figure 1:
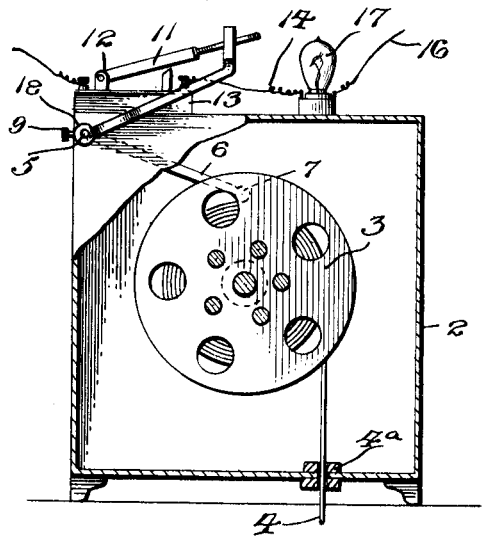
Figure 2:
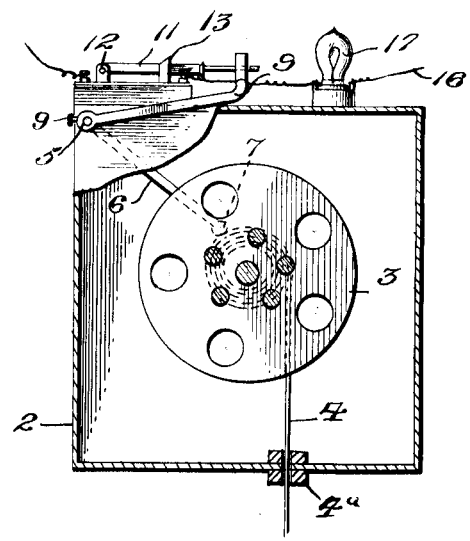
Figure 3:
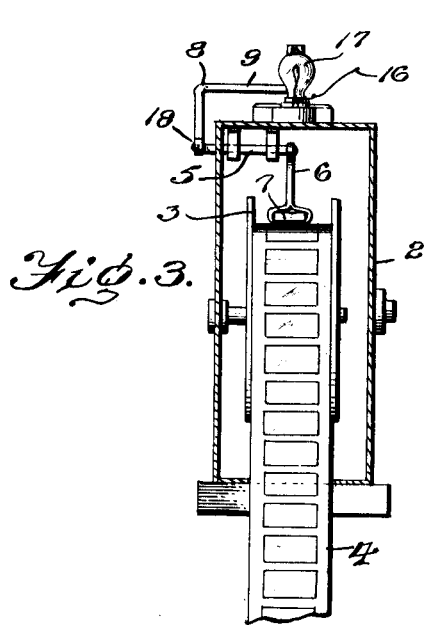
Figure 4:
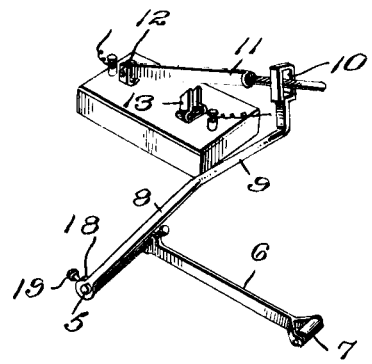
Figure 5:
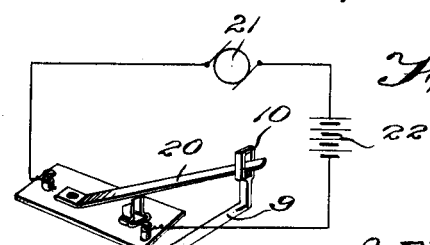

My invention is illustrated in the accompanying drawings wherein:

Figure 1 is a side elevation of a magazine for moving picture reels partly broken away to show my signaling mechanism attached thereto. Fig. 2 is a like view to Fig. 1 but showing the signaling mechanism at the time when the signal circuit is closed. Fig. 3 is a vertical section through the magazine taken on the line 3—3 of Fig. 1. Fig. 4 is a perspective view of the circuit closing devices. Fig. 5 is a perspective view of a modified form of the device.

Corresponding and like parts are referred to in the following description and indicated in all the views of the accompanying drawings by the same reference characters.

Referring to these drawings, 2 designates a film magazine or retort from which the film moves past the gate of the moving picture machine, and 3 designates the film reel disposed within the magazine and constructed in any suitable manner. The film 4 after passing from the reel extends down through a slot in the bottom of the magazine as at 4ª and from thence extends down past the gate of the machine, this gate not being shown.

All the parts so far described are of any ordinary or usual construction and I do not wish to be limited to the construction illustrated.

Rotatably mounted in the upper rear corner of the magazine 2 is a shaft 5 which extends out through the casing of the magazine and which carries upon that portion of the shaft which is housed within the magazine the arm 6 which supports a roller 7 at its outer end. This roller is disposed above the reel 3 and rests upon the film wound thereon. The shaft 5 extends out through the side of the casing as described and carries upon one extremity the outwardly projecting arm 8 whose end 9 is laterally turned and then upwardly turned and slotted as at 10 for engagement with the outer free end of a knife switch 11 pivoted at 12 upon the casing. This knife switch coacts with the usual spaced contacts 13 mounted in any suitable manner upon the casing, and the knife switch is connected in interrupted circuit with these contacts by means of a conductor 14. This conductor as illustrated extends to a battery 15 from which a wire extends to a conductor 16 which in turn leads to the contacts 13. Disposed in the length of the circuit leading from the knife switch to these contacts is a signal. This signal may be either a bell signal or it may be a lamp signal. I have illustrated a lamp 17 disposed in the circuit which when the knife blade 11 is closed into engagement with the contacts 13 glows and indicates to the operator that the film is very nearly run out. While I have illustrated just a plain ordinary electric lamp for the purpose of indicating the signal, I wish it distinctly understood that any form of signaling device may be used, placed in circuit with the contact members 13 and the switch 11.

It is to be particularly noted that the arm 8 has at its pivotal end the collar 18 which surrounds the shaft 5 and which may be adjusted upon the shaft 5 by means of the set screw 19, thus providing for any desired adjustment of the arm 8 and therefore providing for an actuation of the signal at any desired time in the travel of the film.

I have found my device extremely convenient in practice and thoroughly successful.

It is obvious that the details of the construction may be modified so as to suit the device to various forms of moving picture machines.

While I have illustrated a knife blade switch as being the means whereby the circuit through the signal lamp is broken when the film runs out, I wish it understood that I do not wish to be limited to this particular form of circuit making device but that I may use any form of circuit closer, as for instance a spring contact such as shown in Fig. 5. In this figure, 6ª designates the arm carrying the film engaging roller 7ª. 5ª designates the shaft 8ª, the arm projecting from the shaft and having the yoke 9ª at its extremity which engages with and operates a spring contact 20 connected in circuit with a lamp 21 and a battery 22.

While I have illustrated the signal as being disposed upon the magazine, I wish it distinctly understood that the signal might be placed in any desired location and not near the magazine, or that a number of signals might be used. Thus the signal may be used in theaters as a means of warning the manager, pianist or any one concerned when the reel is almost finished.

While I may use a battery service for the lamp, I prefer to use a regular 110 volt light service with which the lamp may be readily connected up.

What I claim is:

1. In a moving picture apparatus, the combination with a magazine and a film reel mounted therein, of a shaft entering the magazine, an arm on the shaft, the free end of said arm resting upon the film on the reel, an arm projecting from the exterior end of the shaft, a signal, a switch in normally open circuit with said signal, said arm on the exterior end of the shaft engaging said switch to move it to a closed position when the film contacting arm moves inward upon the unreeling of a predetermined amount of the film.

2. In a moving picture apparatus, the combination with a magazine and a film reel therein, of a shaft entering the magazine, an arm mounted on the shaft and having a roller resting upon the film, an arm projecting from the exterior end of the shaft and having a slotted extremity, an electrical switch having one end thereof connected to the slotted extremity of the arm, contacts with which said switch is adapted to engage, and a signal connected in a normally open circuit with said switch and contacts.

3. In a moving picture apparatus, the combination with a magazine and a film reel therein, of a shaft entering the magazine, an arm mounted on the shaft and having a roller resting upon the film, an arm projecting from the exterior end of the shaft and having a slotted extremity, an electrical switch having one end thereof connected to the slotted extremity of the arm, contacts with which said switch is adapted to engage, and a signal connected in a normally open circuit with said switch and contacts, said arm on the exterior of the shaft being adjustable with relation to the shaft.

4. In a moving picture apparatus the combination with a film reel, of an arm pivotally supported at one end and at its other end resting upon the film, a circuit closing device operatively connected to said arm and moving therewith, an electric signal and circuit therefor, the circuit closing device being adapted to close the circuit through the signal upon a predetermined movement of the free end of the arm toward the axis of the film reel.

In testimony whereof I affix my signature in presence of two witnesses.

ARTHUR F. KOCH. [L. s.]

Witnesses:
VERN E. LINDERWOOD,
ALBERT ROBY.